United States Patent Office 3,368,178
Patented Feb. 6, 1968

3,368,178
LAMINATED MAGNETIC CORE STRUCTURES
Donald Anthony Bennett and Ephriam Armishaw, Stafford, England, assignors to The English Electric Company Limited, Strand, London, England, a company of Great Britain
Continuation of application Ser. No. 322,575, Nov. 7, 1963. This application Aug. 11, 1966, Ser. No. 571,947
Claims priority, application Great Britain, Nov. 14, 1962, 43,027/62; July 5, 1963, 26,724/63
6 Claims. (Cl. 336—217)

ABSTRACT OF THE DISCLOSURE

This invention is concerned with a laminated magnetic core structure having interleaved butt joints between adjacent portions thereof with passages through the interleaved parts of the joints. The invention provides the passages by the joinder of the end of one lamination having a portion cut out from the end thereof, with the plain straight end of one or more adjacent laminations. Improved and consistently good butt joints between laminations are obtained and the risk of the inadvertent closing of a passage by one or more displaced laminations is eliminated.

---

Figure 1:
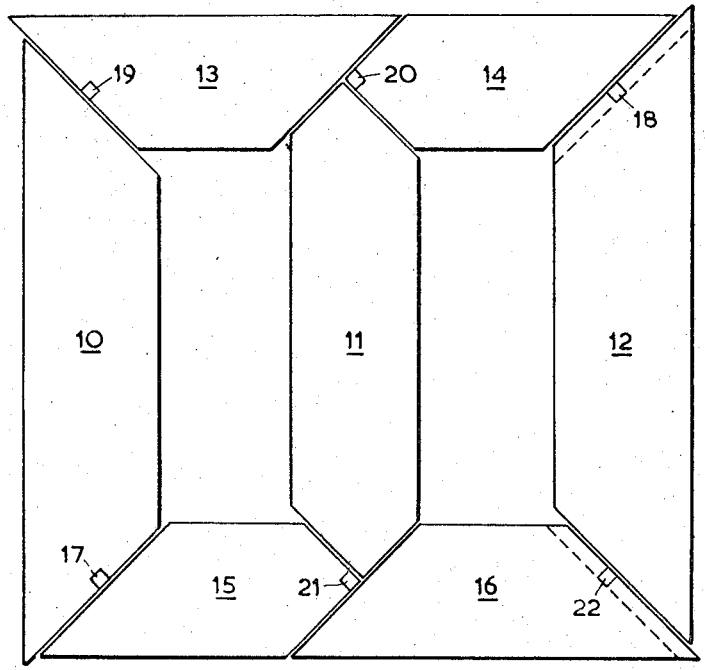

This application is a continuation of Ser. No. 322,575 filed Nov. 7, 1963 now abandoned.

The present invention relates to magnetic core structures having interleaved joints between adjacent limb portions thereof.

According to the invention there is provided a laminated magnetic core structure of the type having interleaved butt joints between adjacent portions thereof, in which at each butt joint in each layer of laminations, one end of one lamination has a cut out portion defining a notch in the said one end of the lamination, the end of each such lamination having a notch therein being disposed adjacent one or more laminations having plain straight ends so that each notch together with the straight end of the or each next adjacent lamination forming the butt joint defines an aperture in each butt joint in the layer, each such aperture in a layer being arranged in alignment with a corresponding aperture in the next adjacent layer so as to provide a passage through the interleaved parts of the joint.

Preferably the cut away portions are rectangular.

The laminations are assembled in the desired number of layers on a jig.

One form of magnetic core structure in accordance with the invention will now be described, by way of example, in relation to the accompanying drawings which show laminations for building core structures suitable for electrical transformers.

Figure 2:
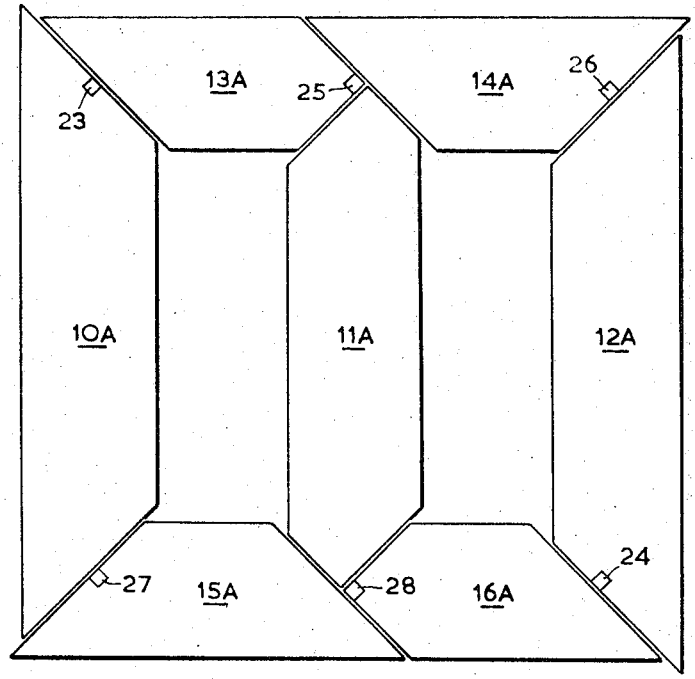

In the drawings:

FIGS. 1 and 2 show the arrangement of the various laminations in any two adjacent layers of a core structure in accordance with the invention.

The single layer of laminations as shown in FIG. 1 comprises three laminations 10, 11 and 12 which in the finished core go to make up the core legs on which the windings are disposed, and four laminations 13, 14, 15 and 16 which go to make up the yoke of the core.

The laminations 10, and 12 to 16 have a square portion cut out of the end thereof as shown at 17 to 22 respectively so that when the complete layer of laminations is assembled as shown each cut out portion is closed by the next one or two adjacent laminations to define a square aperture in the layer.

The single layer of laminations as shown in FIG. 2 differs from the first layer in that it consists of similar laminations differently disposed.

These laminations are indicated at 10A to 16A inclusive and the laminations 10A and 12A to 16A have respective cut out portions 23 to 28. As in the case of the layer shown in FIG. 1 each cut out portion is closed by the or each next adjacent lamination in the layer so as to define a square aperture in the layer.

To build up a complete core alternate layers of laminations as shown in FIGS. 1 and 2 are superposed on one another with the apertures in one layer in alignment with the apertures in the next layer so that all the joints in one layer overlap the joints in the next.

The disposition of the joints between laminations 14A and 12A and 16A and 12A, relative to the corresponding joints in the next adjacent layer are indicated by broken lines in FIG. 1.

A core made up as described above has passages through the overlapping joints between all the limb and yoke portions which go to make up the core and these joints can thus be secured by bolts or the like passing through these passages.

In assembling the complete core the laminations are assembled on a jig.

Whilst the present invention has been described in relation to a laminated magnetic core structure in which the joints in each alternate layer of laminations are interleaved the invention could equally as well be applied to a core structure in which the laminations are so arranged that at least some of the joints are interleaved as between groups of laminations.

In addition the invention can be used in conjunction with conventional methods of clamping joints such, for example, as where the centre limb of a core has overlapping joints with the adjacent portions with a hole centrally in the overlapping part of each such joint whilst the other joints of the core are in accordance with the invention.

We claim:

1. A laminated magnetic core structure of the type having interleaved butt joints between adjacent portions thereof and a passage through each butt joint, in which at each butt joint in each layer of laminations, one end of one lamination has a cut out portion defining an aperture in the said one end of the lamination, the end of each such lamination having an aperture therein being disposed adjacent one or more laminations having plain straight ends so that the aperture together with the straight end of the or each next adjacent lamination forming the butt joint defines an opening in the butt joint in the layer, each such aperture in a layer being arranged in alignment with a corresponding aperture in the next adjacent layer so as to provide the said passage through the interleaved parts of the joint, said core structure further having two outer legs and a middle leg each joined by a butt joint at both ends to two yoke portions to form a core having two windows, the apertures in the butt joints between the outer legs and yoke portions being defined by the joinder of the ends of one lamination having a cut out portion and a plain uncut end of one abutting lamination, and the aperture in the butt joints between the middle leg and the two yoke portions each being defined by the joinder of the end of one lamination having a cut out portion and the plain uncut end of two abutting laminations.

2. A laminated magnetic core structure according to claim 1 in which each cut out portion is rectangular to define a rectangular aperture in the end of a lamination.

3. A laminated magnetic core structure according to claim 1 in which the joints in each alternate layer of laminations are interleaved.

4. A laminated magnetic core structure according to claim 1, in which the laminations are arranged in layers of laminations so that the joints between adjacent portions of the core are interleaved as between the groups of layers of laminations.

5. A laminated magnetic core structure according to claim 4, in which there are additional interleaved butt joints in the core structure having a passage which passes through the overlapping portions of such joint.

6. A laminated magnetic core of the type having two yoke members, two outer legs, and a middle leg, the legs being joined to the yoke members to form a core having two windows, each yoke member comprising two yoke portions one end of each of which meet with one another and with one end of the middle leg in interleaved butt joints having a passage therethrough, the other end of each yoke member meeting with one end of one of the outer legs in interleaved butt joints also with a passage therethrough, in which, at each butt joint in each layer of laminations there is an aperture, each such aperture in a layer of laminations being arranged in alignment with a corresponding aperture in the next adjacent layer so as to form the passages through the interleaved butt joints, each aperture in a butt joint between an outer leg and a yoke member being formed by the joinder of the ends of one lamination having a cut out portion and a plain uncut end of one abutting lamination, and each aperture in a butt joint between the middle leg and the yoke being formed by the joinder of the end of one lamination having a cut out portion and the plain uncut ends of two abutting laminations.

References Cited

UNITED STATES PATENTS

| 1,606,755 | 11/1926 | Field | 336—178 X |
| 3,210,708 | 10/1965 | Franklin et al. | 336—217 |

FOREIGN PATENTS 231,883    4/1960    Netherlands.

LEWIS H. MYERS, *Primary Examiner.*

T. J. KOZMA, *Assistant Examiner.*